J. A. BELCHER.
EMERGENCY TIRE SHOE.
APPLICATION FILED NOV. 25, 1921.

1,432,097.  Patented Oct. 17, 1922.

INVENTOR;
JAMES A. BELCHER,
BY
Horace Barnes
ATTORNEY.

Patented Oct. 17, 1922.

1,432,097

UNITED STATES PATENT OFFICE.

JAMES A. BELCHER, OF TACOMA, WASHINGTON.

EMERGENCY TIRE SHOE.

Application filed November 25, 1921. Serial No. 517,657.

*To all whom it may concern:*

Be it known that I, JAMES A. BELCHER, a citizen of the United States, residing at Tacoma, in the county of Pierce and State of Washington, having invented certain new and useful Improvements in Emergency Tire Shoes, do hereby declare that the following is a full, clear, and exact description of the same.

This invention relates to improvements in emergency shoes for automobile tires.

The object of the invention is the provision of a metallic wheel shoe that may be quickly and easily mounted in operative position on a rear wheel of an automobile when said wheel has lost its traction through being settled in the mud, sand or other yielding or slippery surfaces of the road.

The invention consists in the novel construction of a readily detachable metallic shoe having transversely directed blades arranged thereon adapted to engage to the best advantage with the failing tractive surface of the roadbed; and in the adaptation and combination of certain novel structural features and means of attaching the shoe to the wheel of an automobile, as will be fully described in the following specification, illustrated in the accompanying drawings, and finally set forth in the appended claim.

In said drawings, Figure 1 is a view in side elevation of an automobile with an embodiment of my invention shown thereon in operative condition.

Figure 3:
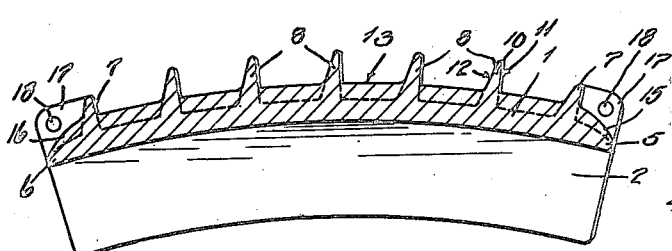
Fig. 3 is a longitudinal sectional view through line 3—3 of Fig. 2.
Figure 4:
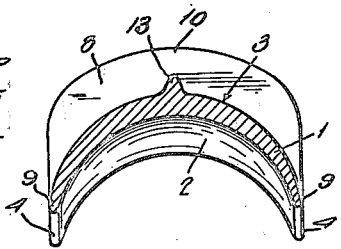
Fig. 4 is a cross-sectional view on line 4—4 of Fig. 2.

Referring to said views, in which similar reference characters denote like parts in the several views, the reference numeral 1 designates the body of a cast metal shoe which is formed with an inner concave surface 2 moulded longitudinally and transversely in amplitude and curvature to conform to the size of the pneumatic tire on which it is to be mounted. The outer convex surface 3 is moulded in corresponding form to the inner surface with the thickness of metal increasing slightly from the lateral edges 4 toward the middle and being also somewhat reduced in thickness at its forward and rear extremities, 5 and 6, respectively. The shoe may be of any suitable length but preferably extends for about forty-five degrees of the circumference of the tire.

Figure 2:
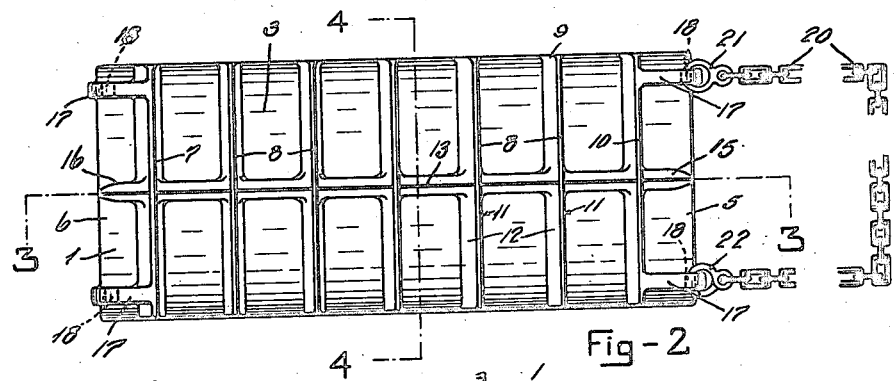
Fig. 2 is a top plan view of the invention, shown detached.
Figure 5:
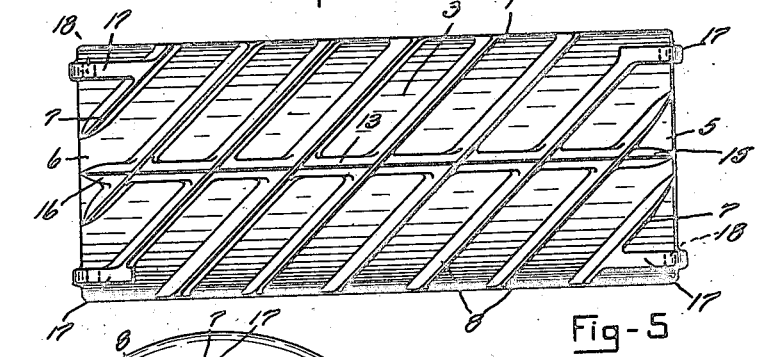
Fig. 5 is a top plan view of the invention showing a varied form in which the blades thereof may be disposed.

Integral blades 7 and 8 are formed on the exterior convex surface of the shoe, extending transversely thereof, either at right angles to the longitudinal axis thereof, as shown in Fig. 2, or diagonally, as in Fig. 5. The blades 7 at each extremity of the shoe are of less height than the intermediate blades 8, which latter blades are substantially of the same height measured from the surface 3. Blades 7 and 8 are highest where bisected by said imagined axial line and are reduced in height toward their lateral extremities where they merge into the body, as at 9. All of the blades are tapered in thickness toward their outer edge 10 and have their forward faces 11 disposed substantially radially of the curvature of the body while their rear faces 12 are inclined at an acute angle with respect to said body.

A central longitudinal rib 13 extends between said blades with which it is integrally connected and extends forwardly and rearwardly thereof to the ends of the body, as at 15 and 16, respectively. Apertured lugs 17 are formed integrally with the body and the blades presented at the forward and rear ends of the shoe at each side, the apertures 18 affording means of connection for chains 20 with which the shoe is fastened to the wheel. There is a chain secured at each end of the shoe, one end of each chain being permanently connected to one of said lugs at each end, as by ring 21, and detachably connected, as by a split ring or snaphook 22, to the correspondingly opposite lug.

Figure 1:
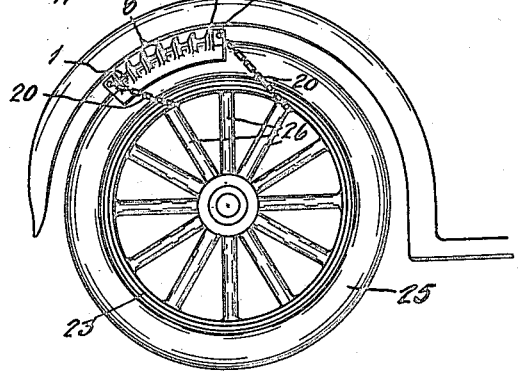

The device is mounted and operated as follows: The shoe of my invention is primarily designed as an emergency appliance to give the rear or driving wheels of an automobile sufficient traction or grip on the ground when the car is stalled in a mud hole or the like to lift itself out of the hole and proceed on its way. The device is intended and adapted to be quickly applied in the emergency and after its use to be taken off and carried in the tool-box or other convenient place in the car. The car being stalled and unable to extricate itself through loss of traction, a shoe of my invention is attached to each of the rear wheels, indicated by the numeral 23, or to one of them if the opposite wheel is on solid ground, by placing the concave inner surface 2 against the tread surface of the tire 25 at any convenient point about the wheel above the portion embedded in the mud-hole or resting on the ground. The forward and rear chains 20 are then engaged between the spokes 26 of the wheel so that the tension thereof will be equalized as much as possible and the ring 22 secured in the proper lug 17. The forward end 5 of the shoe towards which the radially directed sides of the blades are faced is pointed in the direction in which the wheel will rotate in extricating itself, so that the full effect of the blades will be exerted in the effort. When mounted in the manner indicated and as clearly shown in Fig. 1, and the power of the engine is applied with care and slowly to the rear wheels, the shoe will rotate with the wheel and the blades will engage the ground with such effect that however soft or treacherous the condition of the roadbed may be such an extreme grip will be had on the ground that the car will be propelled out of the hole without difficulty.

The device is extremely simple in form and inexpensive, and while it is compact and relatively light in weight it is strong and durable in use and cannot readily be broken in operation. While I have described the invention with some detail I do not intend to limit myself to the precise form shown and described as the device is capable of modification to adapt the same to various types of cars not heretofore mentioned, such as trucks where solid or cushion tires are used, but desire to protect the invention for all purposes for which it may be adapted within the spirit of the invention and the scope of the claim.

Having described my invention, what I claim, is:

An emergency shoe for automobiles, consisting in a body formed to fit upon a section of an automobile tire, integral blades extending across the exterior surface of said body, apertured lugs disposed upon each side at either end of said body and connected to the said blades exposed at said ends, respectively, and a chain connected to the lugs at one side of the body and provided with means to be detachably connected with the lugs upon the opposite side of the body.

Signed at Tacoma, Washington, this 26th day of May, 1921.

JAMES A. BELCHER.